UNITED STATES PATENT OFFICE.

WILHELM HAARMANN, OF HÖXTER, GERMANY, ASSIGNOR TO HAARMANN & REIMER, OF HOLZMINDEN, GERMANY.

PROCESS OF OBTAINING VANILLIN.

SPECIFICATION forming part of Letters Patent No. 560,494, dated May 19, 1896.

Application filed July 9, 1894. Serial No. 516,983. (Specimens.) Patented in England June 20, 1894, No. 11,952; in France June 20, 1894, No. 239,469; in Sweden June 20, 1894, No. 6,196; in Belgium June 21, 1894, No. 110,562; in Norway June 26, 1894, No. 3,765; in Italy June 30, 1894, XXVIII, 36,628, and LXXIII, 2; in Austria July 8, 1894, No. 44/3,058; in Hungary September 24, 1894, No. 1,209; in Luxemburg November 13, 1894, No. 2,164, and in Denmark July 30, 1895, No. 145.

*To all whom it may concern:*

Be it known that I, WILHELM HAARMANN, doctor of philosophy, a subject of the Duke of Brunswick, residing at Höxter, in the Kingdom of Prussia, Germany, have invented new and useful Improvements in Processes of Manufacturing Vanillin from Eugenol and Isoeugenol, respectively, (for which I have obtained Letters Patent in France, No. 239,469, dated June 20, 1894; in Belgium, No. 110,562, dated June 21, 1894; in Norway, No. 3,765, dated June 26, 1894; in Sweden, No. 6,196, dated June 20, 1894; in Denmark, No. 145, dated July 30, 1895; in Austria, No. 44/3,058, dated July 8, 1894; in Hungary, No. 1,209, dated September 24, 1894; in Italy, Reg. Gen., Vol. XXVIII, No. 36,628, and Reg. Att., Vol. LXXIII, No. 2, dated June 30, 1894; in Luxemburg, No. 2,164, dated November 13, 1894, and in England, No. 11,952, dated June 20, 1894,) of which the following is a specification.

I have discovered that isoeugenol is oxidized to vanillin by heating it in a strong alkaline solution in the presence of peroxids, such as the peroxid of sodium, the peroxid of hydrogen, the peroxid of manganese, the peroxid of barium, or the peroxid of lead, &c.

The manufacture of vanillin from isoeugenol may be carried out according to either one of the following processes:

According to the first process, isoeugenol is added to a solution of peroxid of sodium in water prepared in the cold way, and the mixture is cautiously heated until the isoeugenol sodium separated in the beginning has been dissolved and the reaction then taking place is completed.

According to the second process, the thick paste, which is formed by thoroughly mixing peroxid of sodium with small pieces of ice, is gradually conveyed into a hot solution of isoeugenol sodium in water, the liquid being heated until it ceases to foam.

As before stated, the peroxid of sodium may be replaced by the peroxid of hydrogen, the peroxid of barium, and the peroxids of other metals. In these cases an alkaline hydrate, or a concentrated solution thereof, is of course to be added:

In practice four to eight parts of peroxid of sodium, two to three parts of sodium hydrate, and forty to fifty parts of water are employed for one part of isoeugenol. In substituting for the peroxid of sodium its chemical equivalent of another peroxid, ten to twelve parts of sodium hydrate are used instead of two to three parts of sodium hydrate. The sodium hydrate may be replaced, in part, by calcium hydrate in all cases.

From the alkaline solution, as above prepared, the vanillin is disengaged either by means of acids and ethers or chloroform, and then purified in the usual manner. In practice the alkaline solution is acidulated by sulfuric acid and the vanillin extracted by means of ether or chloroform, &c. The ether or chloroform solution is shaken with a solution of bisulfite of sodium, which takes up the vanillin. The solution is decomposed by sulfuric acid and the vanillin again extracted by ether or chloroform. The residue obtained by evaporating the chloroform or ether consists of vanillin. The vanillin, isolated in this manner, is purified by recrystallization from water in the usual way.

In practice the second process hereinbefore referred to is carried out as follows: Eight parts of peroxid of sodium are carefully mixed with a sufficient quantity of comminuted ice to form a thick paste of sodium peroxid hydrate. This is gradually added to a boiling solution of one part of isoeugenol and two or three parts of sodium hydrate in forty to fifty parts of water. The mixture is heated until it ceases to foam. The cold solution is acidulated by sulfuric acid, and the vanillin extracted by means of ether and chloroform, &c. When the sodium peroxid is substituted for by its chemical equivalent of another peroxid, the process is carried out in exactly the same manner. Since the peroxids of other metals decompose slowly, the oxidation requires more time.

It may be noted that vanillin can be manufactured from eugenol by first converting the eugenol into isoeugenol in the usual manner by heating it separately, and, prior to the addition of the peroxid, in the presence of strong alkaline lye, whereupon the process is carried out in the manner herein previously described.

What I claim as new is—

1. The herein-described process for manufacturing vanillin from isoeugenol, consisting in oxidizing isoeugenol in a strong alkaline solution by means of peroxids.

2. The herein-described process for manufacturing vanillin from isoeugenol, consisting in oxidizing isoeugenol in a strong alkaline solution by means of peroxid of sodium.

In testimony whereof I have signed my name to this specification in the presence of two subscribing witnesses.

WILHELM HAARMANN.

Witnesses:
 LOUIS GRAMBOU,
 GUSTAV HÜLSMANN.